US005803073A

United States Patent [19]

[11] Patent Number: 5,803,073

[45] Date of Patent: Sep. 8, 1998

Toth

[54] SECOND STAGE SCUBA DIVING REGULATOR HAVING A PNEUMATIC-DEPENDENT ANTI-SET FEATURE

[76] Inventor: Douglas J. Toth, 8422 Dallas Cir., Huntington Beach, Calif. 92646

[21] Appl. No.: 613,070

[22] Filed: Mar. 8, 1996

[51] Int. Cl.[6] .............................. A62B 9/02; A62B 18/10; A62B 7/04; F16K 31/26

[52] U.S. Cl. ................................ 128/205.24; 128/201.28; 128/204.26; 137/505; 251/359

[58] Field of Search ......................... 128/201.28, 204.26, 128/205.24; 137/454.5, 505; 251/359, 360

[56] References Cited

U.S. PATENT DOCUMENTS

| | | | |
|---|---|---|---|
| 4,094,314 | 6/1978 | Le Cornec . | |
| 4,159,717 | 7/1979 | Cossey . | |
| 4,356,820 | 11/1982 | Trinkwalder, Jr. . | |
| 4,834,086 | 5/1989 | Garofalo . | |
| 5,233,976 | 8/1993 | Ferguson | 128/205.24 |
| 5,265,596 | 11/1993 | Sauze | 128/205.24 |
| 5,343,858 | 9/1994 | Winefordner et al. . | |
| 5,411,053 | 5/1995 | Markham et al. . | |
| 5,419,530 | 5/1995 | Kumar . | |
| 5,437,268 | 8/1995 | Preece . | |
| 5,503,142 | 4/1996 | Semeia | 128/205.24 |
| 5,549,107 | 8/1996 | Gerraffe et al. | 128/204.26 |

*Primary Examiner*—Kimberly L. Asher
*Attorney, Agent, or Firm*—Leonard Tachner

[57] ABSTRACT

A second stage scuba pressure regulator having a valve seat and a floating piston that is free to travel axially within adjustable limits in relationship to the valve seat. Upon pressurization, the piston is pneumatically actuated to make contact with a valve seat set to a pre-adjusted contact interference. Upon depressurization, the piston is free to retract away from the valve seat to a position of no or minimal contact which will prevent long term deformation of the contacting surfaces.

10 Claims, 2 Drawing Sheets

SECOND STAGE SCUBA DIVING REGULATOR HAVING A PNEUMATIC-DEPENDENT ANTI-SET FEATURE

BACKGROUND OF THE INVENTION

1. Field of the Invention

The present invention relates generally to scuba diving equipment and more specifically to an improved second stage regulator having a flow demand valve that is free floating during periods of depressurization and is independently adjustable relative to a valve seat for optimal performance during pressurization. This provides a fluid tight seal during use but with little or no contact pressure during non-use.

2. Prior Art

Conventional pressure regulating devices intended for SCUBA diving typically comprise a demand pressure reduction valve that comprises a valve member that is held under constant spring force against a resilient valve seat. One end of the valve member has a sharp edged orifice that seals against the resilient seat. The resilient valve seat is typically housed in a metal or plastic member (poppet) that aligns the seat and provides for some mechanical linkage to retract the seat from the orifice to initiate fluid flow. Upon inhalation, the vacuum created in the housing of the regulator draws a diaphragm against a lever that in turn mechanically retracts the poppet containing the resilient valve seat away from the orifice and allows fluid flow through the valve. During exhalation, the diaphragm returns to its normal position and the spring returns the lever and poppet to the closed position.

The spring force needed to seal the orifice to the resilient seat without leakage is usually constant and of sufficient force to cause degredation and distortion of the resilient seat over a period of time, especially in the depressurized (non-use) condition. Distortion of the seat results in decreased flow and degraded performance of the valve. Numerous inventions have been tried to lessen the effect.

Thus, there is a need in the scuba diving industry for an improved second stage regulator which provides for spring relaxation as an anti-set feature during non-use of the regulator.

A search of the prior art has revealed the following patents which are deemed to be relevant to the present invention in varying degrees:

| | |
|---|---|
| 4,094,314 | Le Cornec |
| 4,159,717 | Cossey |
| 4,356,820 | Trinkwalder, Jr. |
| 4,834,086 | Garofalo |
| 5,343,858 | Winefordner et al |
| 5,411,053 | Markham et al. |
| 5,419,530 | Kumar |
| 5,437,268 | Preece |

U.S. Pat. No. 4,834,086 to Garofalo is directed to a second stage regulator for an underwater air breathing apparatus with a floating piston that opens the second stage valve during periods of non-use to prevent distortion of the valve seat and the resultant alteration of calibration. When compressed air is applied to the input fitting 7 of valve 4, a valve seat mounting member 8, a floating piston, is forced by the input air against biasing spring 608 into engagement with the bottom of chamber 204 and seat 508 mounted on the floating piston in gauge valve 3. Breathing by the user opens valve 3 through the action of monostat diaphragm 12 and lever 2. The air flow through valve 4 results in a pressure drop upstream of the floating piston, resulting in spring 608 moving the piston back away from valve 3 increasing the air flow to the user at parity with the inhalation effort.

U.S. Pat. No. 4,094,314 to Le Cornec is directed to a second stage pressure regulator that has a nozzle that is held in operating position by the compressed inlet air and when not in use, the nozzle is only lightly held against the sealing pellet so as to cause no irreversible deformation and maladjustment of the pressure regulator. An intermediate body member 4 holds nozzle 5 that is held lightly by spring 15 against the seat 5*a* of the valve member 5. Pressurized air from the first stage regulator applied to the inlet 1 forces the nozzle against the valve seat for normal operation. The valve biased closed by spring 9 is operated by membrane 19 through lever 11.

U.S. Pat. No. 4,159,717 to Cossey is directed to an anti-set protector for second stage scuba regulators. A removable spacer 52 is provided to be interposed between the cover 50 and flexible diaphragm 42 during storage of the regulator. The spacer holds the valve assembly 20 open so that the closure 26 does not take on a compressive set with the resulting loss of sealing ability.

Various devices have been used to mechanically move the orifice away from the seat during non-use (Cossey) but these devices are external to the valve and not automatic. They also require removal before use. Not removing them will cause temporary malfunction of the valve (loss of air). A floating piston has also been used as a valve member before (Le Cornec, Garofalo). A disadvantage of that design however is the lack of an independent and precise adjustment of the position of the valve member with respect to the resilient seat. It is desirable to be able to fine tune the position of the orifice with respect to the seat in order to achieve the least amount of sealing force needed to close the valve. Using excessive force to close the valve will conversely require excessive force to open it. The goal is to provide a valve that is as easy to initiate as possible to reduce the inhalation vacuum (effort) required on the part of the user. Typically, there are at least two adjustment means provided. One is the valve member with respect to the resilient seat that is usually accomplished by means of a threaded valve member and bore. The second is an adjustment of the spring tension, usually accomplished by changing the length of the spring (Winefordner). The valve of Le Cornec and Garofalo combine the two adjustments. The valve seat cannot be moved away from the valve member without also relaxing the spring, and conversely cannot be moved closer without increasing spring tension. The adjustability of the valve is therefore limited to prevent optimal adjustment and operation of the valve.

From the aforementioned prior art description it will be seen that there is apparently no known prior art which provides an anti-set pneumatically dependent relaxation feature in a second stage scuba diving regulator. There is therefore a continuing need for an improved second stage scuba diving regulator of the type having a pneumatically dependent anti-set poppet seat.

SUMMARY OF THE INVENTION

This invention provides a valve member that is both free floating during periods of depressurization (non-use) and independently adjustable in relationship to the resilient valve seat. This allows the valve to be adjusted for optimal performance and allows the valve member to retract away from the resilient seat automatically during periods of non-use which are typically very long compared to periods of use. The result is an adjustable valve that resists deformation of the resilient seat.

The parts of the valve are contained in an axial conduit. The conduit provides a threaded connection at one end for a pressurized hose (not shown). A portion of the inside bore of the conduit is threaded to receive an adjustable sleeve. The valve member orifice is free to slide axially in the bore of the sleeve, but is restricted in its forward travel by the sleeve. In this example, the bore of the sleeve is a six-sided hexagonal shape, and accepts the hexagonal shape of the forward portion of the valve member. In this manner, the valve member is keyed to the sleeve, and adjustment is provided by turning the orifice with a suitable tool, such as a screwdriver or hex wrench in a slot provided. Any shape to key the valve member to the sleeve such as a square or slot would serve the same purpose. It is preferred that the sleeve be of a low friction material to allow the orifice to slide with minimal force.

Upon pressurization, the O-ring seal on the rear of the valve member moves it forward to the limit set by the adjustment sleeve. The sleeve is adjusted until the orifice embeds into the resilient seat just enough to provide a fluid tight seal.

Upon inhalation through the mouthpiece, the diver creates a vacuum inside the regulator housing and the diaphragm retracts. The diaphragm contacts the lever sliding on a low friction disc in the elastomeric diaphragm, drawing it inward. The lever has legs that penetrate both sides of the axial conduit through a square hole. One side of the lever leg lies flat against the side of the square hole and the other against the leg of the poppet. As the lever leg pivots in the square hole, it pushes the poppet and resilient seal away from the orifice, opening the valve. During exhalation, the diaphragm returns to its normal position, and the spring returns the poppet to its sealing position.

Upon depressurization, the valve member is free to retract away from the resilient seal relieving contact pressure with the orifice sharp edge as there is no longer any force other than O-ring tension holding it in place. With little or no force keeping the orifice in contact with the resilient seat, it will not become deformed during long periods of non-use. Thus, this anti-set feature is automatic when turning off the regulator. To insure retraction of the seat, an optional thin wave shaped spring washer may be located between the sleeve and orifice and would provide enough force to insure positive return of the orifice away from the resilient seal.

OBJECTS OF THE INVENTION

It is therefore a principal object of the present invention to provide an improved second stage regulator for scuba diving, the regulator having an automatic anti-set feature responsive to air pressure from the first stage to avoid deformation of the resilient valve seat during non-use.

It is an additional object of the present invention to provide an improved second stage regulator for scuba diving having a flow demand valve with a pneumatically activated valve orifice wherein a soft elastomeric seal engages a sharp-edge orifice only when the interior chamber of the regulator is pressurized and relaxes the orifice edge from the seal when the interior chamber of the regulator is unpressurized.

It is still an additional object of the present invention to provide an improved second stage regulator for scuba diving wherein an automatic anti-set feature comprises a pneumatically responsive valve orifice which is free floating during periods of depressurization of the regulator and which is forced to engage the seal during periods of pressurization of the regulator.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which.

DETAILED DESCRIPTION OF A PREFERRED EMBODIMENT

This invention provides a valve member 15 that is both free floating during periods of depressurization (non-use) and independently adjustable in relationship to the resilient valve seat. This allows the valve to be adjusted for optimal performance and allows the valve member to retract away from the resilient seat automatically during periods of non-use which are typically very long compared to periods of use. The result is an adjustable valve that resists deformation of the resilient seat.

Figure 1:
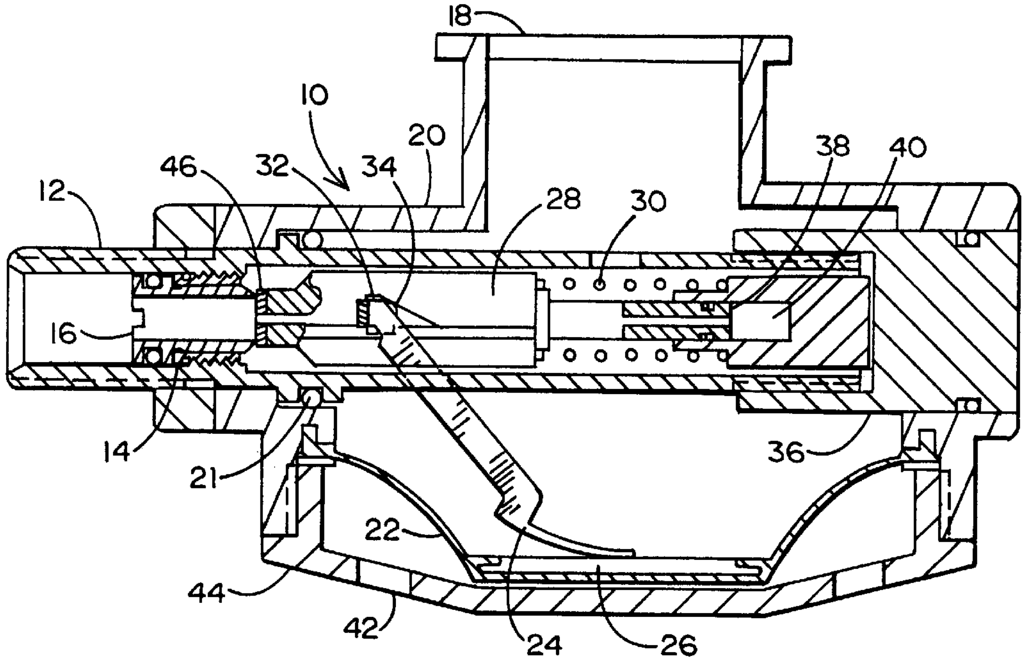
FIG. 1 is a cross-sectional view of the regulator of the present invention shown in its pressurized configuration.

As seen best in FIG. 1, a breathing regulator 10 comprises an axial conduit 12 in which is positioned valve member 15 having a floating orifice 16 within a floating sleeve 14. The regulator 10 also comprises a mouthpiece 18 extending from a housing 20. A diaphragm 22 responds to a reduction in pressure within a diaghragm cover 44 relative to ambient pressure passages 42. The diaphragm 22 employs a low friction disc 26 which pushes a lever 24 causing a poppet 28 to retract a resilient seal or seat 46 to withdraw from sharp edge 19 of orifice 16 to permit air to flow into the regulator and through mouthpiece 18 to a diver (see FIG. 4). An O-ring 21 prevents pressure leakage along the conduit 12. Another O-ring 17 serves the purpose of assuring forceful urging of the floating orifice 16 against the elastomeric seal 46 whereby the sharp edge 19 is embedded in the seal to assure valve closure until lever 24 pulls the seal and poppet to compress the spring 30 and open the valve member 15. A pressure transmitting stem 38 feeds the pressurized air into a pressure balancing chamber which assures return of the seal to close the valve member when the lever is relaxed upon exhalation through the mouthpiece. A spring tension adjuster 36 co-acts with spring 30 to return the seal when the chamber 40 balances the pressure in the regulator.

Figure 4:
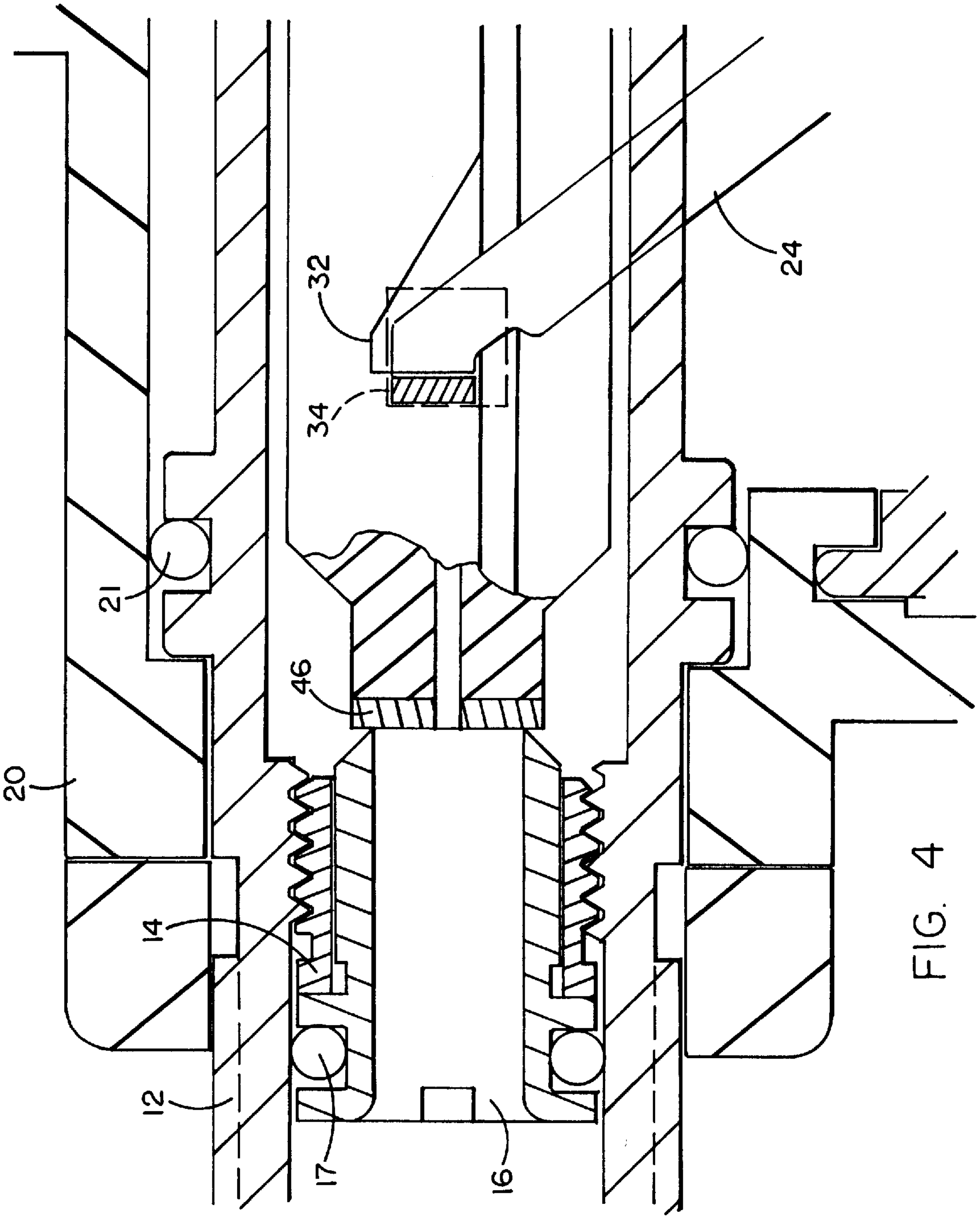
FIG. 4 is a still further enlarged view of the orifice/seal portion of the regulator illustrating the pneumatically responsive feature thereof and illustrating the poppet withdrawn from the valve during inhalation.

As seen in FIG. 4 the parts of the valve are contained in an axial conduit 12. The conduit provides a threaded connection at one end for a pressurized hose (not shown). A portion of the inside bore of the conduit is threaded to receive an adjustable sleeve 14. The valve member and orifice 16 is free to slide axially in the bore of the sleeve, but is restricted in its forward travel by the sleeve. In this example, the bore 23 of the sleeve is a six-sided hexagonal shape, and accepts the hexagonal shape of the forward portion 25 of the valve member. In this manner, the valve member is keyed to the sleeve, and adjustment is provided by turning the orifice with a suitable tool, such as a screwdriver or hex wrench in a slot 13 provided. Any shape to key the valve member to the sleeve such as a square or slot would serve the same purpose. It is preferred that the sleeve be of a low friction material to allow the orifice to slide with minimal force.

Upon pressurization, the O-ring seal 17 on the rear of the valve member moves it forward to the limit set by the adjustment sleeve 14. The sleeve is adjusted until the orifice 16 embeds into the resilient seat 46 just enough to provide a fluid tight seal.

Figure 2:
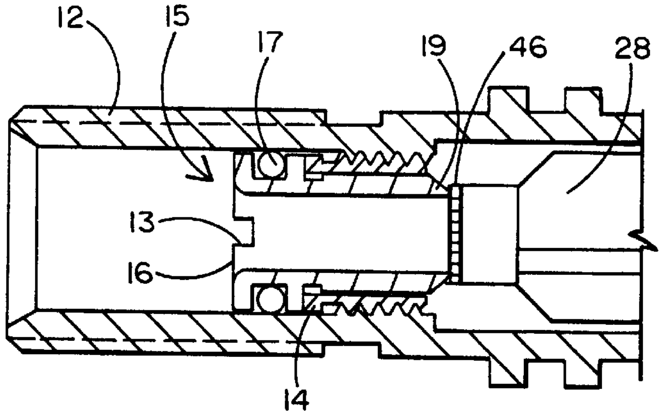
FIG. 2 is an enlarged cross-sectional view of a portion of the regulator of the present shown in its pressurized configuration.

As seen in FIG. 2, upon inhalation through the mouthpiece 18, the diver creates a vacuum inside the regulator housing 20 and the diaphragm 22 retracts. The diaphragm contacts the lever 24 sliding on a low friction disc 26 in the elastomeric diaphragm, drawing it inward. The lever 24 has legs 32 that penetrate both sides of the axial conduit 12 through a square hole 34. One side of the lever leg lies flat against the side of the square hole and the other against the leg of the poppet 28. As the lever leg pivots in the square hole, it pushes the poppet and resilient seal 46 away from the orifice, opening the valve. During exhalation, the diaphragm returns to its normal position, and the spring 30 returns the poppet to its sealing position.

Figure 3:
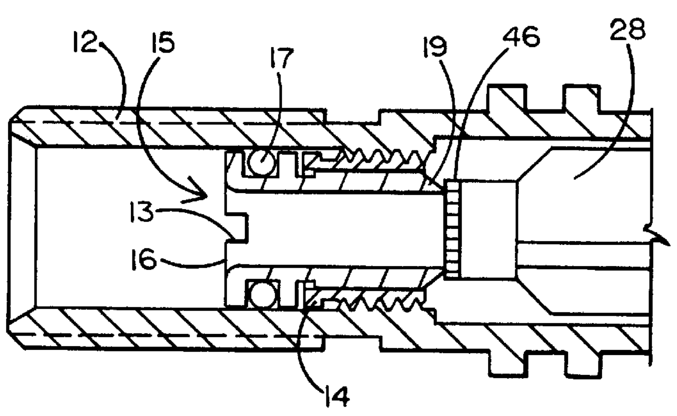
FIG. 3 is an enlarged cross-sectional view of a portion of the regulator of the present invention shown in its unpressurized configuration.

As seen in FIG. 3, upon depressurization, the valve member 15 is free to retract away from the resilient seal 46 relieving contact pressure with the orifice sharp edge 19 as there is no longer any force other than O-ring tension holding it in place. With little or no force keeping the orifice 16 in contact with the resilient seat 46 it will not become deformed during long periods of non-use. Thus, this anti-set feature is automatic when turning off the regulator 10. To insure retraction of the seat, an optional design would include a thin wave shaped spring washer (not shown) between the sleeve 14 and orifice 16 that would provide enough force to insure positive return of the orifice away from the resilient seal 46.

Thus it will be understood that the present invention provides a significant improvement in the art of breathing regulators. The invention provides an anti-set feature wherein a floating orifice member responds to pressurization by forcefully engaging a resilient seal with a sharp edge orifice and responds to depressurization by permitting disengagement between the seal and sharp edge orifice and thus avoid a reduction in long term seal integrity. Furthermore, the unique structure of the regulator disclosed herein permits adjustment of the travel limit of the floating orifice member during pressurization so that optimum performance may be achieved.

Those having skill in the art to which the present invention pertains, will now, as a result of the disclosure made herein, perceive various modifications which may be made to the invention. By way of example, the structure of the valve member may be readily altered to provide other ways of limiting the travel of the floating orifice as well as of varying such limits to adjust performance parameters. Accordingly, such modifications are deemed to be within the scope of the invention which is to be limited only by the claims appended hereto and their equivalents.

We claim:

1. An improved diver's breathing regulator of the type having a tube connected to a source of pressurized air and having a demand valve actuated by a lever in response to inhalation by the diver, the lever withdrawing a poppet having an elastic seal from a sharp edge orifice to permit the pressurized air to pass through the orifice and into the regulator and out through a mouthpiece tube, the poppet returning the elastic seal to engage the sharp edge orifice upon exhalation by the diver thereby terminating input air flow through the orifice until the next breathing cycle of the diver; the improvement comprising:

a cylindrical sleeve adjustably positioned within said tube for limited axial movement therein;

a floating orifice member having said sharp edge orifice at one end and having a cylindrical shape with an exterior diameter just smaller than the interior diameter of said sleeve whereby said orifice member may slide coaxially within said sleeve; and means for limiting the travel of said orifice member within said sleeve toward said elastomeric seal in response to said pressurized air.

2. The improvement recited in claim 1 wherein said lever is connected to said poppet at a camming hole to pull said poppet and elastic seal away from said sharp edge orifice upon inhalation of the diver.

3. The improvement recited in claim 2 wherein said lever comprises at least one leg penetrating said tube adjacent said camming hole.

4. The improvement recited in claim 1 wherein said orifice member is configured to be free to float within said sleeve relative to said seal when said regulator is depressurized whereby to prevent deformation of said seal during non-use periods of said regulator.

5. The improvement recited in claim 1 wherein said means for limiting comprises a shoulder on said orifice member and wherein said shoulder is configured to engage an axial end of said sleeve.

6. The improvement recited in claim 1 further comprising means for adjusting the relative position of said sleeve within said tube, said adjusting means being configured to provide external accessibility through said tube.

7. The improvement recited in claim 6 wherein said adjusting means comprises a threaded interior surface along at least a portion of said tube and a threaded exterior surface along at least a portion of said sleeve, and said orifice member providing a slot and a non-circular exterior perimeter whereby rotation of the orifice member by engagement with said slot causes relative movement of said threaded surfaces.

8. The improvement recited in claim 1 further comprising a compression spring adjacent said poppet and tending to resist the withdrawal of said elastic seal from said sharp edge orifice.

9. The improvement recited in claim 8 further comprising adjustment means for partially compressing said compression spring to a selected degree prior to withdrawal of said elastic seal from said sharp edge orifice.

10. An improved second stage scuba dive regulator having a tube connected to a source of pressurized air, a valve member in the tube, the valve member having an orifice device and an elastic seal, the latter being an end surface of a poppet which is made to move the seal from the orifice device in response to diver demand for air; the improvement comprising:

a valve member having a floating orifice device for movement within said tube; said floating orifice device being responsive to said pressurized air to forcefully engage said seal until said seal is moved in response to diver demand for air and being responsive to the absence of said pressurized air to float free of said seal; and means for adjusting the degree of engagement between said orifice device and said seal for varying the pressure reduction within said regulator required to move said seal from the orifice device.

* * * * *